No. 745,903. PATENTED DEC. 1, 1903.
A. PLOSS.
SEEDING MACHINE.
APPLICATION FILED OCT. 3, 1903.
NO MODEL.
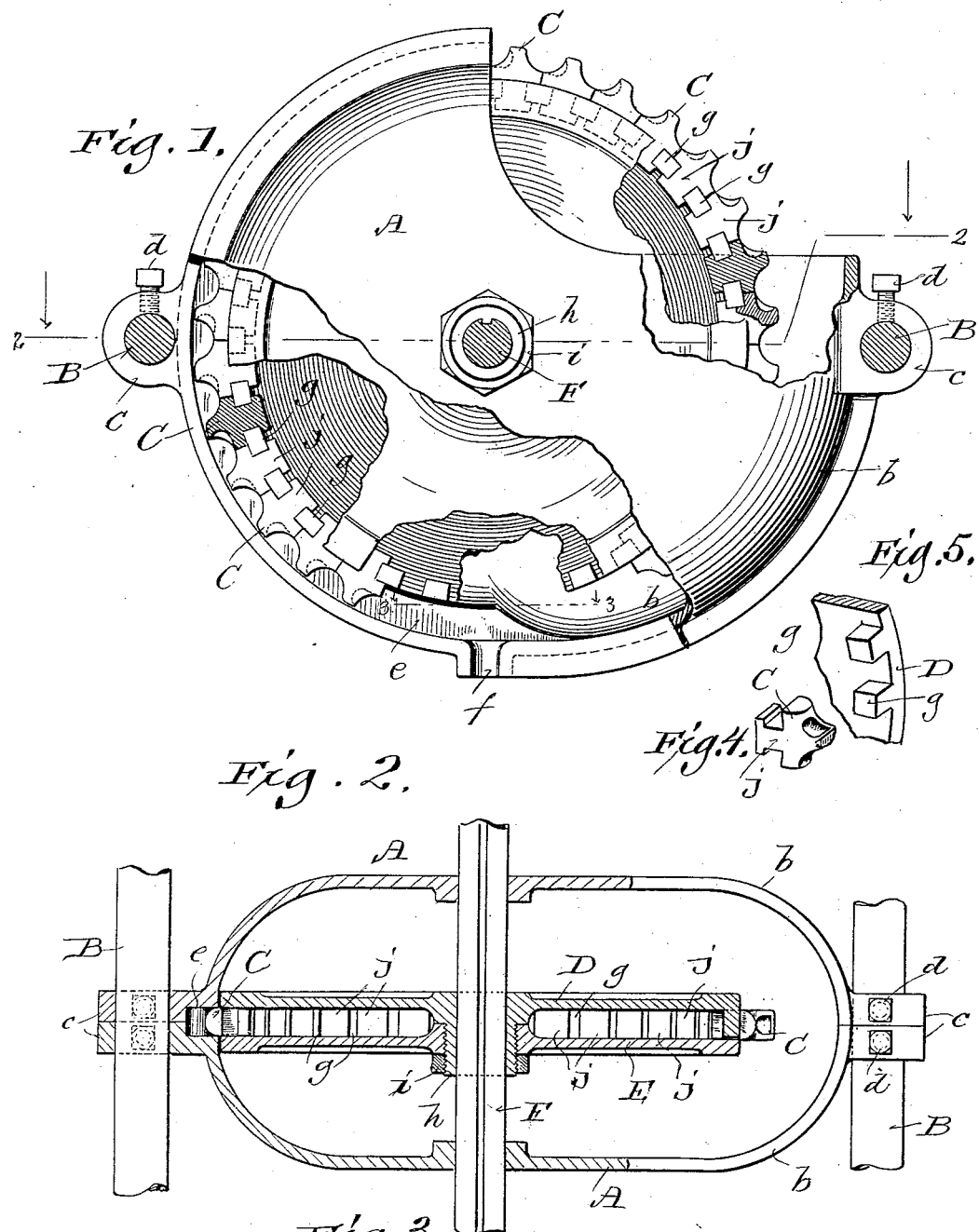

No. 745,903. Patented December 1, 1903.

UNITED STATES PATENT OFFICE.

ADAM PLOSS, OF MENOMONEE FALLS, WISCONSIN, ASSIGNOR OF ONE-HALF TO MAX F. LEPPER, OF MENOMONEE FALLS, WISCONSIN.

SEEDING-MACHINE.

SPECIFICATION forming part of Letters Patent No. 745,903, dated December 1, 1903.

Application filed October 3, 1903. Serial No. 175,538. (No model.)

*To all whom it may concern:*

Be it known that I, ADAM PLOSS, a citizen of the United States, and a resident of Menomonee Falls, in the county of Waukesha and State of Wisconsin, have invented certain new and useful Improvements in Seeding-Machines; and I do hereby declare that the following is a full, clear, and exact description thereof.

The improvements consist in certain peculiarities of construction and combination of parts, constituting the simple economical feed mechanism for seeding-machines that is hereinafter particularly set forth with reference to the accompanying drawings and subsequently claimed.

Figure 1 of the drawings represents a side elevation of a seed-feed mechanism in accordance with my invention, having parts thereof broken away; Fig. 2, a plan view of the same, partly in horizontal section, this view being indicated by line 2 2 in Fig. 1. Fig. 3 is a horizontal section view indicated by line 3 3 in said Fig. 1; Fig. 4, a perspective view of a seeding-wheel cup, and Fig. 5 a similar view of a fragment of the wheel.

Referring by letter to the drawings, A indicates each of two matching sections of a circular casing having a rear upper opening into a hopper that is formed by rear extensions $b$ of said sections. Each casing-section is provided with front and rear apertured ears $c$, engaged by supporting-rods B, and set-screws $b$ are employed in connection with said ears to bind upon said rods. The sections of the casing are made to form a central circular groove $e$ within said casing. This groove is provided with a lower vertical outlet $f$, and a terminal of said groove is within the hopper extension of said casing.

Guided in the groove $e$ of the casing are reversible radial cups C, constituting parts of a wheel that also comprises a disk D, having inner lateral cogs $g$ at intervals of a circle, and another disk E is in screw-thread connection with the hub $h$ of the one aforesaid. The disk D is keyed on a shaft F, that turns in the casing-sections axially thereof, and a set-nut $i$ is run on the hub of said disk against the other disk, E, in screw-thread connection with said hub, said shaft being turned by suitable means to rotate the wheel comprising the parts aforesaid.

Each of the cups C is provided with a shouldered shank $j$, and this shank is set in between cogs $g$ of the disk D and there held by means of the disk E, run on the hub of the former disk.

The seed is picked up in the hopper by the cups of the wheel aforesaid and carried around in the casing-groove $e$ to the outlet $f$ of same, there being a drop of said seed at predetermined intervals, these intervals being greater or less, according to the kind of seed to be planted. When all the cups are operative, the seed will be dropped at short intervals; but by reversing each alternate cup the drop of seed will occur at intervals twice as great as before. The intervals may be increased by reversing two, three, or more of the cups between those left to carry the seed to the outlet, and for seeding corn it is intended to reverse all but two of said cups, these two working cups being then diametrically opposite one another.

A plurality of the casings and their contents are adjustable on the rods B to regulate distance between rows, and the feeding mechanism is especially designed for sugar-beet seeding, although it may be utilized for sowing any kind of seed.

The wheel agitates the seed in the hopper, and thereby prevents sticking, but without injury to said seed, and the result is a regular distribution of the aforesaid seed at predetermined intervals, this being of particular importance in the planting of sugar-beet seed.

Having thus described my invention, what I claim as new, and desire to secure by Letters Patent, is—

1. A feed mechanism comprising a suspended separable circular casing having a rear upper opening, a rear hopper extension and an inner central groove provided with a lower outlet; a terminal of the groove being within the hopper; a rotatory shaft extending through the casing axially of the same, and a wheel consisting of a laterally-cogged disk fast on the shaft, reversible radial cups that travel in said hopper and casing-groove and have shouldered shanks alternating with the disk-cogs, and another disk in detachable engagement with the hub of the one aforesaid against said cogs and cup-shanks.

2. A feed mechanism comprising a suspended separable circular casing having a rear upper opening, a rear hopper extension and an inner central groove provided with a lower outlet, a terminal of the groove being within the hopper; a rotatory shaft extending through the casing axially of the same, a wheel fast on the shaft, and reversible radial cups constituting parts of the wheel arranged to travel in said hopper and casing-groove.

In testimony that I claim the foregoing I have hereunto set my hand, at Menomonee Falls, in the county of Waukesha and State of Wisconsin, in the presence of two witnesses.

ADAM PLOSS.

Witnesses:
WM. B. CAMPBELL,
C. W. FRASER.